US007792499B2

(12) United States Patent
Chen et al.

(10) Patent No.: US 7,792,499 B2
(45) Date of Patent: Sep. 7, 2010

(54) WIRELESS COMMUNICATIONS SYSTEM

(75) Inventors: Ming Kang Chen, Singapore (SG);
Chin Kang Lee, Singapore (SG); Yew Kwee Lew, Singapore (SG); Shih Jih Yao, Singapore (SG); Siew Kheen Lee, Singapore (SG)

(73) Assignee: St. Electronics (Info-Comm Systems) Pte. Ltd., Singapore (SG)

( * ) Notice: Subject to any disclaimer, the term of this patent is extended or adjusted under 35 U.S.C. 154(b) by 937 days.

(21) Appl. No.: 10/585,415

(22) PCT Filed: Jan. 9, 2004

(86) PCT No.: PCT/SG2004/000010
§ 371 (c)(1),
(2), (4) Date: Nov. 30, 2006

(87) PCT Pub. No.: WO2005/067165
PCT Pub. Date: Jul. 21, 2005

(65) Prior Publication Data
US 2009/0191822 A1 Jul. 30, 2009

(51) Int. Cl.
*H04B 1/38* (2006.01)
(52) U.S. Cl. .................. 455/90.2; 455/569.1; 455/511; 455/518; 455/519
(58) Field of Classification Search ............. 455/90.2, 455/518, 519, 511, 515, 74, 74.1, 557, 560, 455/569.1, 41.2, 41.3; 381/311, 91, 111; 370/321, 442
See application file for complete search history.

(56) References Cited

U.S. PATENT DOCUMENTS

| 5,978,689 | A | * | 11/1999 | Tuoriniemi et al. | ...... | 455/569.1 |
| 6,311,052 | B1 | | 10/2001 | Lenz | | |
| 6,546,101 | B1 | * | 4/2003 | Murray et al. | ......... | 379/433.02 |
| 6,745,014 | B1 | * | 6/2004 | Seibert et al. | ............... | 455/74.1 |
| 2003/0207694 | A1 | * | 11/2003 | Legare et al. | ................ | 455/511 |
| 2007/0127742 | A1 | * | 6/2007 | Seven | .......................... | 381/111 |

FOREIGN PATENT DOCUMENTS

DE 298 20 552 U1 2/1999

* cited by examiner

*Primary Examiner*—Tan Trinh
(74) *Attorney, Agent, or Firm*—Sughrue Mion, PLLC

(57) ABSTRACT

The present invention provides a wireless communications system comprising a first radio transceiver configured to communicate on a first radio channel, a second radio transceiver configured to communicate on a second radio channel, a first base transceiver unit (BTU) configured to communicate with the first radio transceiver, a second BTU configured to communicate with the second radio transceiver, and a client transceiver unit (CTU) configured to communicate with both the first BTU and the second BTU. The CTU is thereby configured to communicate on the first radio channel via the first radio transceiver and the first BTU. The CTU is also configured to communicate on the second radio channel via the second radio transceiver and the second BTU. The CTU comprises at least one speaker for enabling a user to listen to communications on the first and second radio channels concurrently.

13 Claims, 6 Drawing Sheets

WIRELESS COMMUNICATIONS SYSTEM

FIELD OF THE INVENTION

The present invention relates to a wireless communications system and, in particular, to a wireless radio communications system. A client transceiver unit is also provided for use with the system.

BACKGROUND OF INVENTION

Emergency service members can communicate with each other using wireless communications equipment. Each member of a call group has a radio transceiver which can be used to communicate with other members of that call group on the same radio channel. Activating the push-to-talk (PTT) switch on a radio enables a user to transmit speech and thereby speak to each member on that radio channel. Alternatively, the user can listen to other members speaking on the radio channel when the PTT switch is not activated, thereby receiving any speech transmitted by other members. Hence, a member can communicate on a radio channel by transmitting speech and listening to communications transmitted by other members, as required.

Members from various emergency services including police, fire and ambulance services are often called to any given emergency operation. Each emergency service uses a different radio channel, and indeed often a different radio frequency (RF) communications protocol (e.g. FM, UHF, analog, digital, etc.), to communicate wherein, for example, fire fighters communicate on a first radio channel using a first protocol and police officers communicate on a second radio channel using a second protocol. Accordingly, in order to communicate with both groups, it is necessary to carry two radios. It will be appreciated that this makes it difficult to monitor communications from both groups and accordingly, that an improved apparatus is required.

SUMMARY OF INVENTION

According to one aspect of the present invention, there is provided a wireless communications system comprising:
 a first radio transceiver configured to communicate on said first radio channel and a second radio transceiver configured to communicate on a second radio channel;
 a first base transceiver unit (BTU) configured to communicate with said first radio transceiver and a second BTU configured to communicate with said second radio transceiver;
 a client transceiver unit (CTU) configured to communicate on said first radio channel via said first radio transceiver and said first BTU, and on said second radio channel via said second radio transceiver and said second BTU;
 said CTU comprising a headset which carries a first speaker for enabling said user to listen to said first radio channel with one ear and a second speaker for enabling said user to listen to said second radio channel with the other ear, thereby enabling a user to listen to communications on said first and second radio channels concurrently.

Preferably, said CTU comprises a microphone to enable said user to speak on said first and second radio channels, and switching means for enabling said user to select on which of said first and second radio channels said user is able to speak.

According to a further aspect of the present invention, there is provided a client transceiver unit (CTU) configured to communicate with a first base transceiver unit (BTU) configured to communicate with a first radio transceiver on a first radio channel and a second BTU configured to communicate with a second radio transceiver on a second radio channel,
 said CTU being configured to communicate on said first radio channel via said first radio transceiver and said first BTU; and
 said CTU being configured to communicate on said second radio channel via said second radio transceiver and said second BTU, said CTU comprising a headset having a first speaker for enabling said user to listen to said first radio channel with one ear and a second speaker for enabling said user to listen to said second radio channel with the other ear, thereby enabling a user to listen to communications on said first and second radio channels concurrently.

BRIEF DESCRIPTION OF DRAWINGS

A preferred embodiment of the invention will now be described, by way of example, in relation to the accompanying drawings, wherein.

DESCRIPTION OF PREFERRED EMBODIMENT

Figure 1:
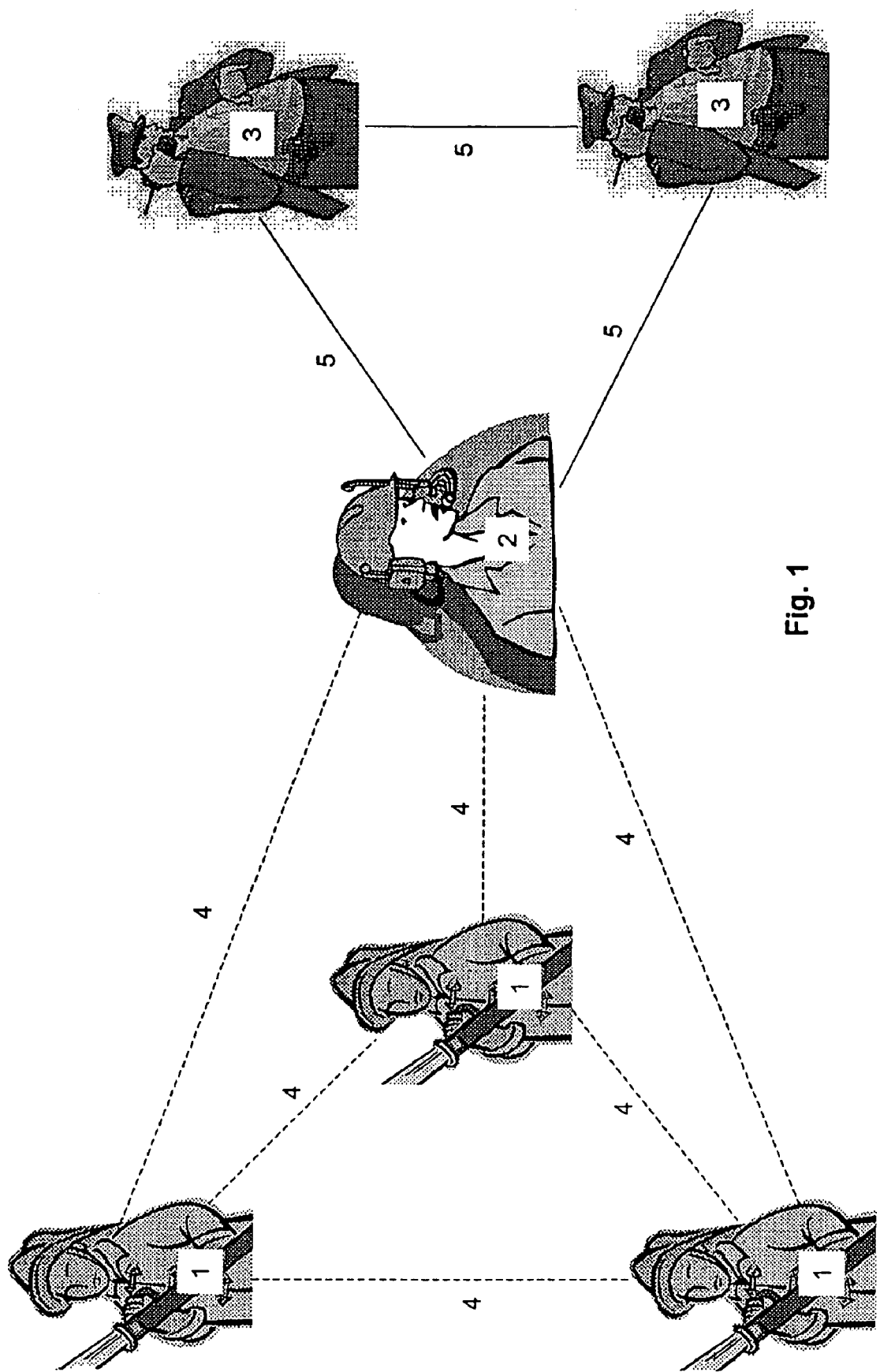
FIG. 1 shows an emergency operation.

According to an embodiment of the present invention, there is provided an emergency operation as shown in FIG. 1. A first radio network (i.e. call group) is formed by three firefighters 1 communicating on a first radio channel 4 wherein each firefighters has a first radio transceiver 600 enabling two-way communication with each member of the first radio network. A second radio network is formed by two police officers 3 communicating with one another on a second radio channel 5 using a second radio transceiver 605 each. There is also an operations coordinator 2 having a first 600 and second radio transceiver 605 thereby enabling communications with the first and second radio networks respectively.

Figure 2:
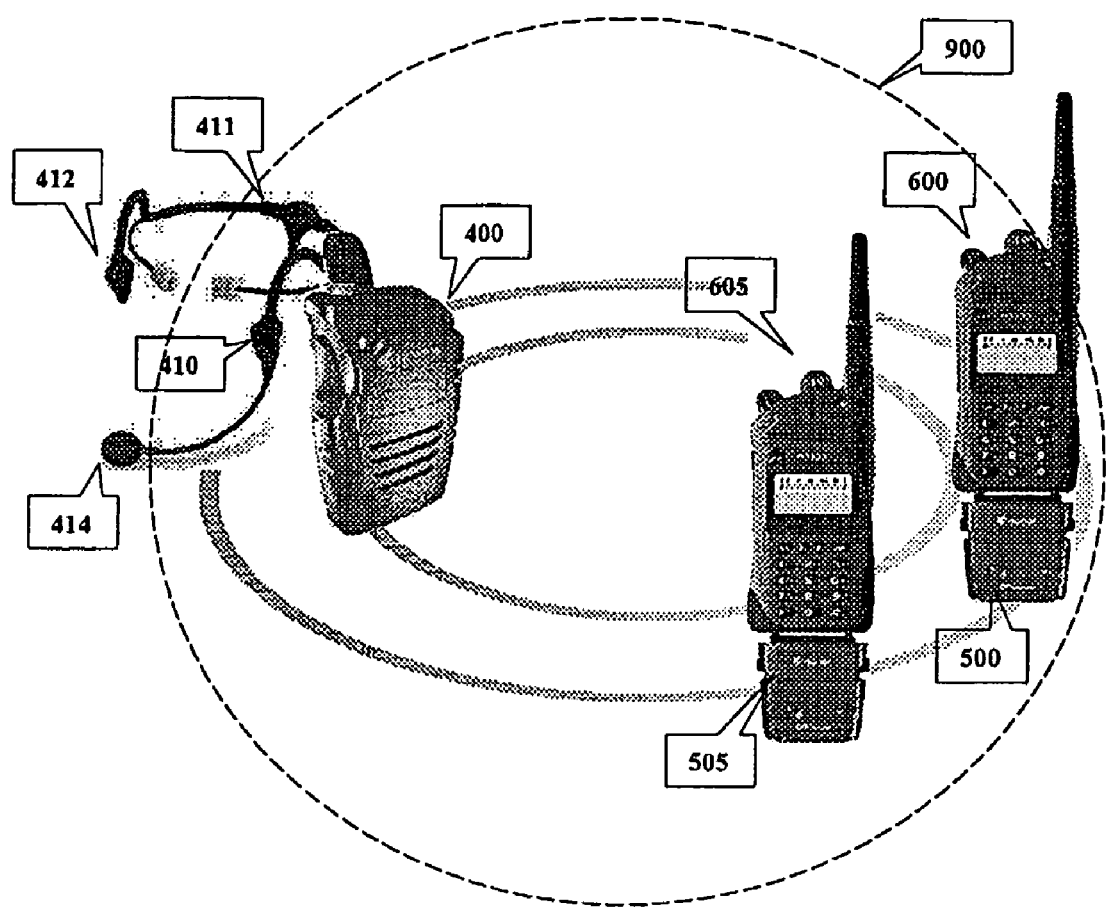
FIG. 2 shows a wireless communications system.

FIG. 2 shows a portable wireless communications system 900 being used by the operations coordinator 2. A client transceiver unit (CTU) is strapped to the chest of the operations coordinator 2 and is configured to wirelessly communicate with a first 500 and second base transceiver unit (BTU) 505. Each BTU 500,505 is adapted to physically connect to a radio transceiver 600,605 thereby establishing a wired communication link between, for example, the first BTU 500 and the first radio transceiver 600. When connected in this manner, the first BTU 500 is configured to communicate with the first radio transceiver 600. Similarly, the second BTU 505 is configured to communicate with the second radio transceiver 605.

The CTU 400 enables the operations coordinator 2 to listen to conversations on the first and second radio networks concurrently, and speak to members of both the first and second radio networks as an alternative to operating the first 600 and second radio transceivers 605 independently.

The CTU 400 can operate in either a single channel mode or dual channel mode according to the mode of operation selected by the operations coordinator 2.

When the single channel mode is selected, the operations coordinator 2 can listen to either the first radio channel 4 or the second radio channel 5, via an internal speaker 402, and switch between each channel. When the CTU 400 is set to the first radio channel 4, the operations coordinator 2 is able to listen to conversation on the first radio channel 4. That is, the first radio transceiver 600 receives speech on the first radio channel 4 which is then passed on to the CTU 400 via the first BTU 500. An analogous process occurs when the user sets the CTU 400 to listen to the second radio channel 5.

The operations coordinator 2 can also speak into an internal microphone 404 whilst activating a first push-to-talk (PTT) switch 420 and the CTU 400 will thereby transmit the speech on the single channel selected. That is, if the PTT switch 420 is pushed when the operations coordinator 2 is listening to the first radio channel 4, then the operations coordinator 2 is able to speak on the first radio channel 4. Speech is therefore transmitted from the CTU 400, via the first BTU 500 and first radio transceiver 600 respectively, to the first radio channel 4. An analogous process occurs when the user sets the CTU 400 to the second radio channel 5 and then activates the first PTT switch 420.

An external headset 411 comprising an external left speaker 410 for placement over the users left ear, an external right speaker 412 for placement over the users right ear and an external microphone 414 can alternatively be connected to the CTU 400, and thereby over-ride the function of the internal speaker 402 and internal microphone 404. In the single channel mode, the same audio signal is reproduced in the external left and right speakers 410,412 when the headset is connected to the CTU 400. The external microphone 414 is also used to detect the speech of the operations coordinator 2 as the internal microphone 404 is disabled.

The operations coordinator 2 can alternatively configure the CTU 400 to operate in a dual channel mode and is then able to listen to speech on the first and second radio channels 4,5 concurrently via the internal speaker 402. During periods when the utilisation of each channel is high, however, there may be simultaneous conversations occurring on the first radio channel 4 and second radio channel 5, which may confuse the operations coordinator 2 listening to both conversations at once. In this situation, it is particularly advantageous to connect the external headset 411 to the CTU 400 and thereby enable the operations coordinator 2 to concurrently listen to the first radio channel 4 through the left external speaker 410 and the second radio channel 5 through the right external speaker 412.

The CTU 400 further comprises a second PTT switch 422 for use in the dual channel mode. In this mode, the operations coordinator 2 can speak on the first radio channel 4 when activating the first PTT switch 420 and can speak on the second radio channel 5 when activating the second PTT switch 422. Pushing both the first and second PTT switches 420, 422 concurrently, enables the operations coordinator 2 to concurrently speak on both the first radio channel 4 and the second radio channel 5. In contrast to the CTU 400, each radio transceiver 600, 605 only has a single PTT switch.

As the CTU 400 is wirelessly connected to the BTUs 500, 505, the operations coordinator 2 can roam around and communicate with members using the first and second radio networks whilst only carrying the CTU 400 and headset 411. The relatively heavy combination of BTUs 500,505 and radio transceivers 600,605 need not be carried. When a BTU 500 is out of range from communicating with the CTU 400, the CTU 400 sounds an alarm to warn the operations coordinator 2. This alarm is automatically switched off when the CTU 400 and BTU 500 are back within range of each other and the communication link is re-established.

A registration process is initially undertaken when establishing the wireless radio communications system 900 between the CTU 400 and up to two BTUs 500,505. This process involves an exchange of information for the purpose of establishing an encrypted secured link between the CTU 400 and each BTU 500,505. Speech cannot be communicated between the CTU 400 and BTUs 500,505 before the registration process is complete.

Figure 3:
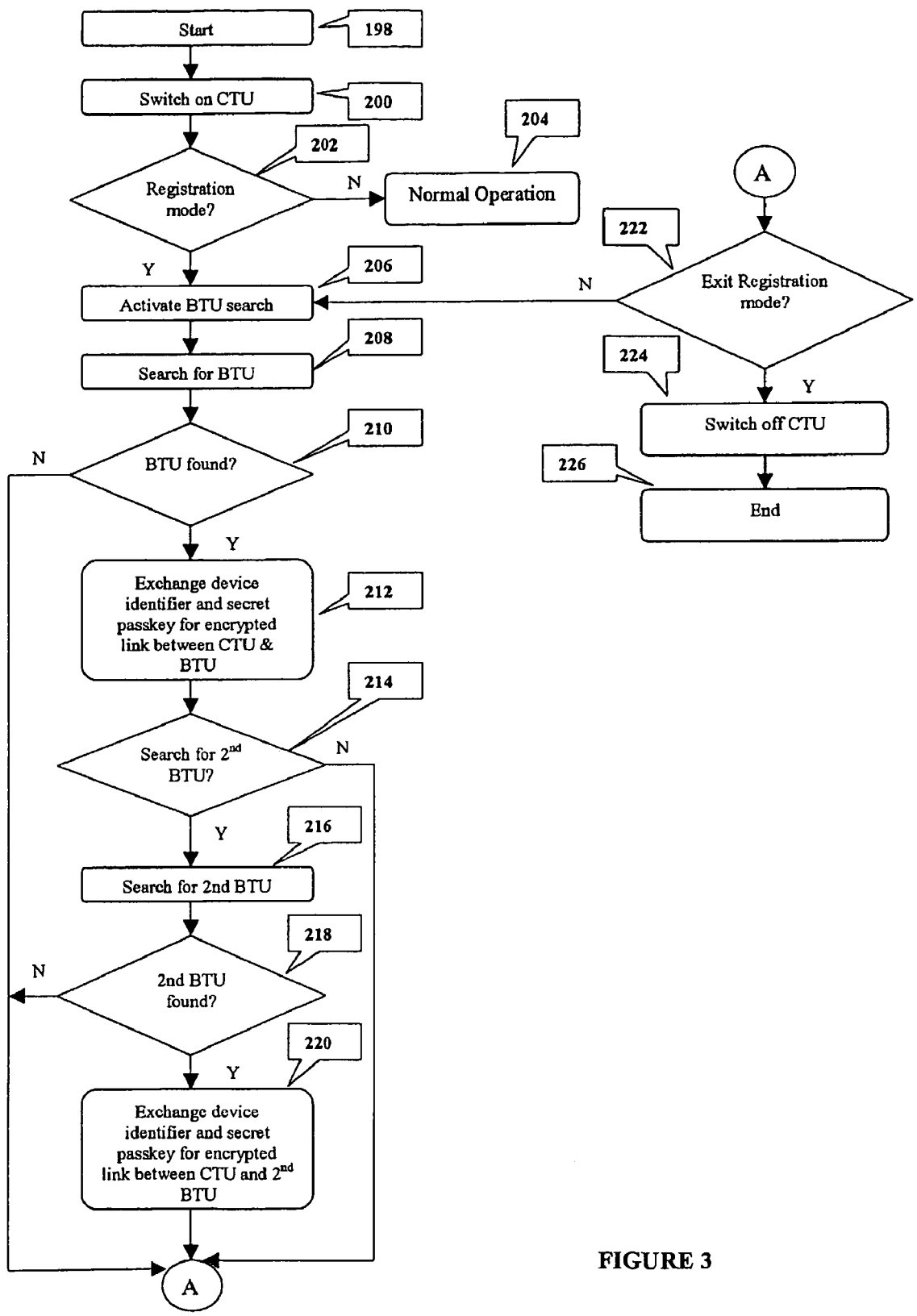
FIG. 3 shows a flowchart for registering a client transceiver unit (CTU) in a wireless communications system.
Figure 4:
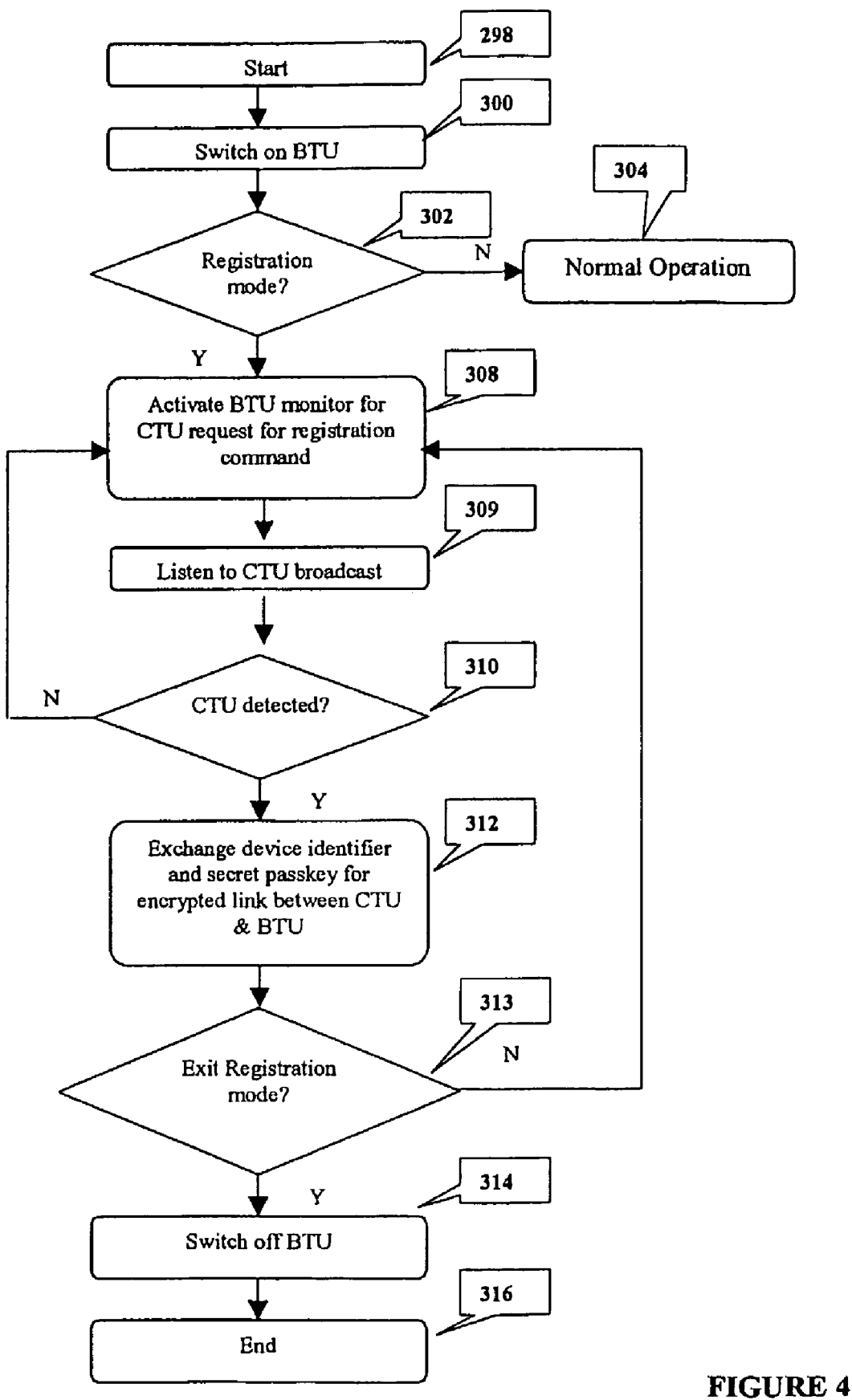
FIG. 4 shows a flowchart for registering a base transceiver unit (BTU) in a wireless communications system.

The registration process for a CTU 400 and a BTU 500,505 are shown in FIGS. 3 and 4 respectively. The registration processes of FIGS. 3 and 4 occur in parallel for a given CTU-BTU pair and involve the exchange of information between the CTU 400 and a BTU 500,505 (i.e. handshaking). Steps 198 and 298 are the registration process beginnings for the CTU 400 and a BTU 500,505 respectively. Once the CTU 400 is switched on 200, a decision is made 202 as to whether normal operation 204 or registration of the CTU 400 is required. In the latter case, a BTU search 206 is activated wherein the CTU 400 searches for an available BTU 500,505 to connect with 208 by transmitting a periodic request for registration command. Step 210 involves determining if a BTU 500,505 is found to connect with the CTU 400.

Once the BTU 500,505 is switched on 300, a decision is made 302 as to whether normal operation 304 or registration of the BTU 500,505 is required. In the latter case, a BTU 500,505 in registration mode will monitor for a CTU 400 request for registration command 308. The BTU 500,505 will listen to the CTU 400 broadcast 309. Once the BTU 500,505 receives a request for registration command 310, the CTU 400 and BTU 500,505 exchange information in steps 212 and 312 respectively, including unit identifiers and secret passwords for establishing the encrypted secured link.

The CTU 400 and BTU 500,505 thereby complete the registration process by exchanging a common encryption password that is shared between these two units. After registration, the CTU 400 is thereby able to communicate on, for example, the first radio channel 4 via the first BTU 500. Similarly, the CTU 400 can undertake a further registration process with the second BTU 505, whereas the first BTU 500 exits registration mode 313, is turned off 314 and the registration process for the registered BTU is ended 316.

When it is decided to undertake a further registration process of the second BTU 505 at step 214 with the CTU 400, the CTU 400 searches for an available BTU 500,505 to connect with 216 by transmitting a periodic request for registration command. Step 218 involves determining if a second BTU 505 is found to connect with the CTU 400. Once the BTU 505 receives a request for registration command 310, the CTU 400 and BTU 505 exchange information in steps 220 and 312 respectively, including unit identifiers and secret passwords for establishing the encrypted secured link. The CTU 400 exits registration mode 222 if required, is turned off 224 and the registration process for the CTU 400 is ended 226.

A CTU 400 can thereby establish a secured link between the first radio network and second radio network by registering with the first BTU 500 and the second BTU 505 respectively or vice versa. After the registration process is complete, the CTU 400 can transmit and receive on the first radio channel 4 and second radio channel 5 thereby communicating with any of the members of the first radio network and second radio network respectively.

Figure 5:
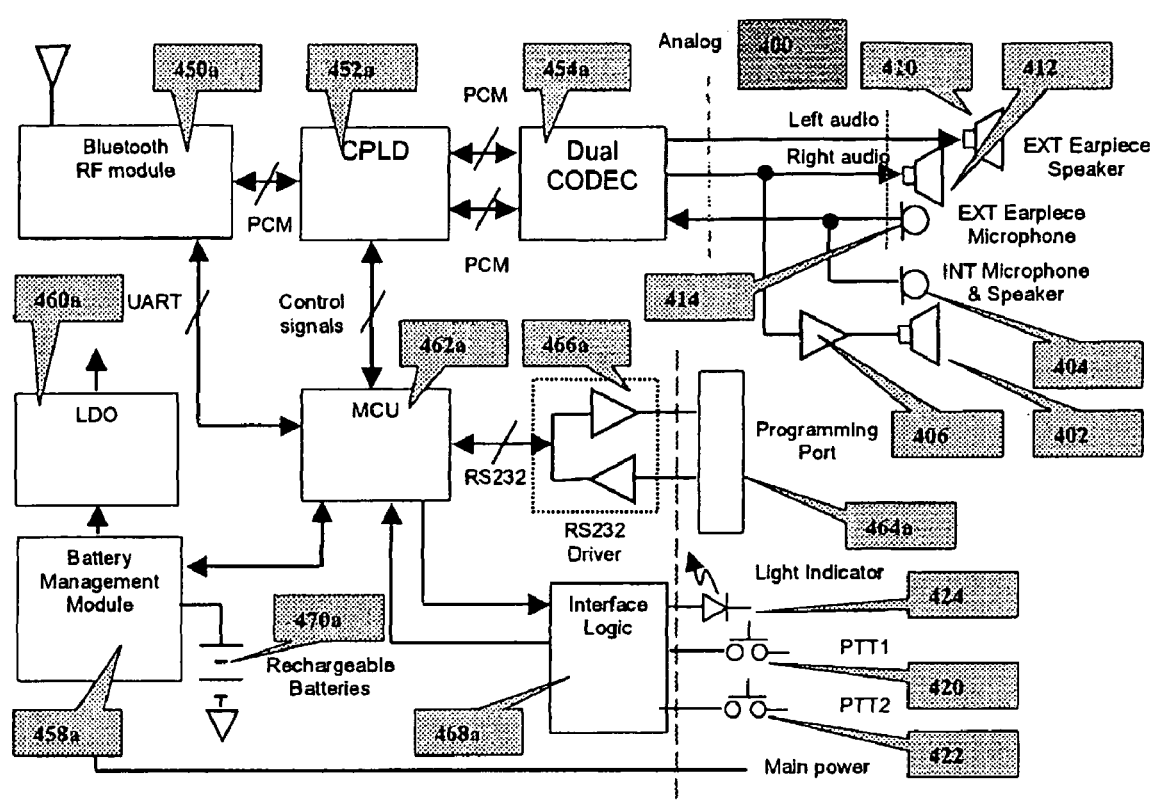
FIG. 5 shows a block diagram of a CTU.
Figure 6:
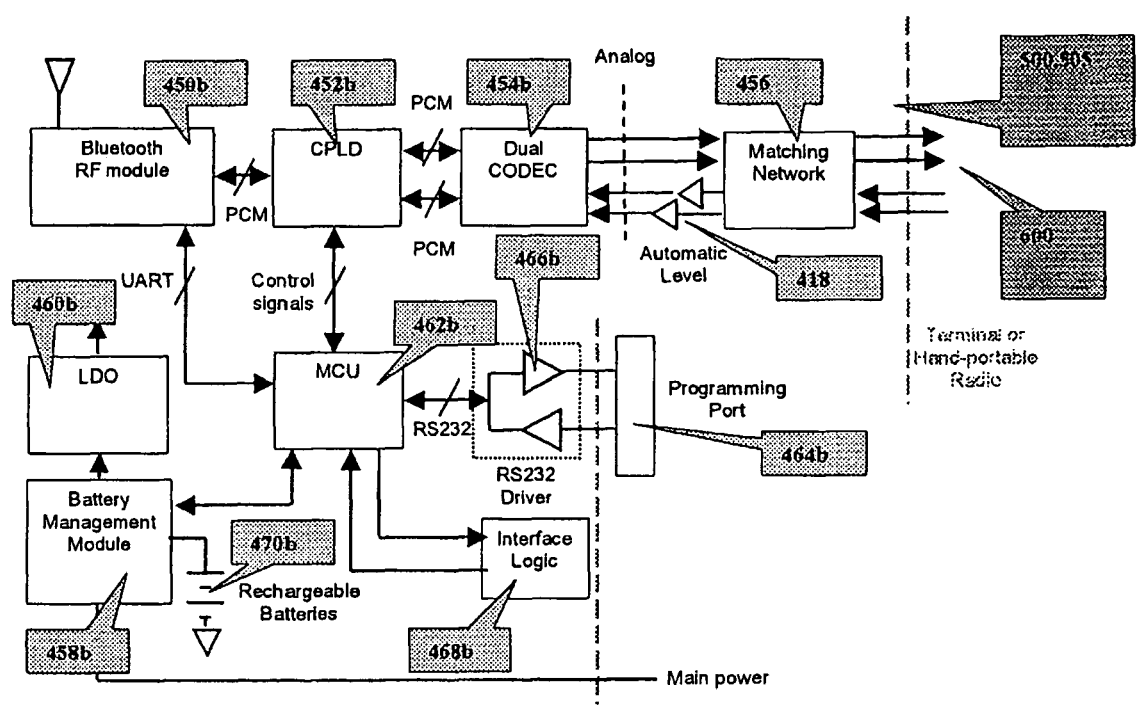
FIG. 6 shows a block diagram of a BTU.

Block diagrams showing the functional structure of the CTU 400 and BTUs 500,505 are shown in FIGS. 5 and 6 respectively. The electronics circuitry required to realise each of these functional blocks would be well known to a person skilled in the art, as would the techniques for interconnecting the various blocks to implement the wireless communications system 900. Owing to the analogous functionality of the CTU 400 and BTUs 500,505 in many respects, it is apparent that many of the functional blocks used in either unit serve a similar purpose.

A radio frequency (RF) transceiver module 450 is provided to transmit and receive speech on channels 4,5 using bluetooth signaling protocol thereby providing the wireless communication link between the CTU 400 and the BTUs 500, 505. During transmission, a dual encoder/decoder (CODEC) 454 encodes analog audio signals from either microphone 404,414, or the radio transceiver 600,605, into a digital pulse coded modulation (PCM) signal which is provided to a complex programmable logic device (CPLD) 452. The CPLD then multiplexes the PCM signal which is, in turn, provided to the RF transceiver module 450 for transmission.

When receiving RF input, the CPLD 452 demultiplexes the digitized PCM stream from the RF transceiver module 450 into two digitized PCM streams, which are subsequently provided to the dual CODEC 454 for decoding. The dual CODEC 454 coverts the two digitized PCM signals into two analog audio signals which can be combined when driving the internal speaker 402 of the CTU 400. Alternatively, the two analog audio signals can be respectively provided to the left and right external speakers 410, 412 when connected, thereby also disabling the internal speaker 402. An amplifier 406 may be provided to amplify the analog audio signal to drive the internal speaker 402.

Each BTU 500,505 has a matching network 456 for connecting the Dual CODEC 454b to the radio transceiver 600, 605. Automatic level adjustment 418 may be provided for normalizing the input audio signal to the dual CODEC 454b. A battery management module 458 is provided to recharge the batteries 470 of the CTU 400 and BTUs 500,505 when these units are connected to a mains supply.

A low drop-out regulator (LDO) 460 is provided to regulate the supply voltage for the various circuit devices. A micro controller unit 462 controls the function of each block in the CTU 400 and BTU 500,505 units. The user can program and configure the micro controller unit 462 via the programming port 464 using RS232 protocol 466. Security password information may be re-configured in this manner. Interface logic 468a is provided for detecting the activation of the PTT switch 420, 422 in the CTU 400 wherein, upon activation, a light indicator 424 is illuminated. Each BTU 500,505 also has interface logic 468b for detecting user input.

Additional variations and embodiments of the present invention will be apparent to a person skilled in the art.

The preferred embodiment describes an emergency operation involving firefighters 1 and police officers 3, however, a person skilled in the art would appreciate that the present invention could be similarly used for coordinating separate teams of firefighters operating in different call groups. In this manner, a central firefighter could, for example, coordinate a team comprising a plurality of firefighters in the field communicating on a first radio channel and a plurality of firefighters in trucks communicating on a second radio channel.

In addition, each firefighter 1 in the preferred embodiment was using a first radio transceiver 600 which would typically be a hand-held portable radio. In an alternative embodiment, the first radio transceiver 600 could be a mobile radio installed in a fire truck.

The preferred embodiment described a group of firefighters 1 communicating on a dedicated first radio channel 4 and a group of police officers 3 communicating on a dedicated second radio channel 5. The present invention is equally well suited for trunking networks where the radio channels are not dedicated, and may be re-assigned upon demand.

Although the preferred embodiment involved using bluetooth protocol for establishing the wireless communications link between the CTU 400 and a BTU 500,505, a person skilled in the art would appreciate that many alternative protocols could be used.

The preferred embodiment provided for a BTU 500,505 which could be physically connected to a conventional radio transceiver 600, 605. In practice, a specialised radio transceiver comprising a BTU 500, 505 could alternatively be provided. In another embodiment, the wireless communications system 900 could be provided by a single apparatus in a single housing. In addition, although while less preferred, the wireless link between a BTU 500,505 and the CTU 400 could be wired and still maintain some of the advantages of the preferred embodiment. Further, while it is preferred that the headset 411 has a pair of speakers (i.e. one for each radio channel 4,5), some of the benefits of the invention can be provided by a single speaker which can be used to monitor both radio channels.

It would be apparent to a person skilled in the art that the registration process (FIGS. 3, 4) and CTU/BTU functional blocks (FIGS. 5, 6) of the preferred embodiment may be readily varied.

In a further embodiment of the present invention, there is provided a wireless communications system 900 comprising a first radio transceiver 600 configured to communicate on a first radio channel 4 and a second radio channel 5. A first BTU 500 configured to communicate with the first radio transceiver 600 is also provided. The CTU 400 is configured to communicate with the first BTU 500 and is thereby configured to communicate on the first and second radio channels 4,5 via the first radio transceiver 600 and the first BTU 500.

These and other modifications may be made without departing from the ambit of the invention, the nature of which is to be determined from the foregoing description.

The claims defining the invention are as follows:

1. A wireless communications system comprising: a first radio transceiver configured to communicate on said first radio channel and a second radio transceiver configured to communicate on a second radio channel; a first base transceiver unit (BTU) configured to communicate with said first radio transceiver and a second BTU configured to communicate with said second radio transceiver; a client transceiver unit (CTU) configured to communicate on said first radio channel via said first radio transceiver and said first BTU, and on said second radio channel via said second radio transceiver and said second BTU; said CTU comprising a headset which carries a first speaker for enabling said user to listen to said first radio channel with one ear and a second speaker for enabling said user to listen to said second radio channel with the other ear, thereby enabling a user to listen to communications on said first and second radio channels concurrently.

2. A communications system as claimed in claim 1 wherein said CTU comprises a microphone to enable said user to speak on said first and second radio channels, and switching means for enabling said user to select on which of said first and second radio channels said user is able to speak.

3. A communications system as claimed in claim 2 wherein said switching means comprises: a first push-to-talk (PTT) switch for enabling said user to speak on said first radio channel; and a second PTT switch for enabling said user to speak on said second radio channel; wherein said user is able to speak on said first radio channel when said first PTT switch is activated and said user is able to speak on said second radio channel when said second PTT switch is activated.

4. A communications system as claimed in claim 3 wherein said user is able to concurrently speak on said first and second radio channels when said first and second PTT switches are activated concurrently.

5. A communications system as claimed in claim 1 wherein said CTU is configured to wirelessly communicate with said first and second BTUs.

6. A communications system as claimed in claim 5 wherein bluetooth protocol is used when communicating between said CTU and said first and second BTUs.

7. A communications system as claimed in claim 1 wherein each BTU is configured to communicate with each respective radio transceiver via a wired link.

8. A client transceiver unit (CTU) configured to communicate with a first base transceiver unit (BTU) configured to communicate with a first radio transceiver on a first radio channel and a second BTU configured to communicate with a second radio transceiver on a second radio-channel; said CTU being configured to communicate on said first radio channel via said first radio transceiver and said first BTU; and said CTU being configured to communicate on said second radio channel via said second radio transceiver and said second BTU, said CTU comprising a headset having a first speaker for enabling said user to listen to said first radio channel with one ear and a second speaker for enabling said user to listen to said second radio channel with the other ear, thereby enabling a user to listen to communications on said first and second radio channels concurrently.

9. A CTU as claimed in claim 8 comprising a microphone to enable said user to speak on said first and second radio channels, and switching means for enabling said user to select on which of said first and second radio channels said user is able to speak.

10. A CTU as claimed in claim 9 wherein said switching means comprises: a first push-to-talk (PTT) switch for enabling said user to speak on said first radio channel; and a second PTT switch for enabling said user to speak on said second radio channel; wherein said user is able to speak on said first radio channel when said first PTT switch is activated and said user is able to speak on said second radio channel when said second PTT switch is activated.

11. A CTU as claimed in claim 10 wherein said user is able to concurrently speak on said first and second radio channels when said first and second PTT switches are activated concurrently.

12. A CTU as claimed in claim 11 wherein said CTU is configured to wirelessly communicate with said first and second BTUs.

13. A CTU as claimed in claim 12 wherein bluetooth protocol is used when communicating between said CTU and said at least one BTU.

* * * * *